United States Patent [19]

Takeda

[11] Patent Number: 4,597,311
[45] Date of Patent: Jul. 1, 1986

[54] FINAL SPEED-REDUCTION GEARING ASSEMBLY IN TRANSMISSION UNIT

[75] Inventor: Yoshiki Takeda, Aichi, Japan

[73] Assignee: Toyota Jidosha Kabushiki Kaisha, Aichi, Japan

[21] Appl. No.: 477,398

[22] Filed: Mar. 21, 1983

[30] Foreign Application Priority Data

Mar. 23, 1982 [JP] Japan .............................. 57-46602

[51] Int. Cl.[4] .......................... F16H 37/08; F16H 1/38
[52] U.S. Cl. ........................................... 74/694; 74/710
[58] Field of Search .................. 74/710, 713, 710.5, 74/711, 694, 695

[56] References Cited

U.S. PATENT DOCUMENTS

| 2,808,739 | 10/1957 | Mueller | 74/711 |
| 3,260,132 | 7/1966 | West | 74/710 |
| 3,330,169 | 7/1967 | Carrico | 74/711 |
| 3,474,689 | 10/1969 | Young | 74/711 |
| 3,715,936 | 2/1973 | Jones | 74/713 |
| 3,901,103 | 8/1975 | Hufstader | 74/710 |
| 4,046,030 | 9/1977 | Suzuki | 74/710 |
| 4,263,823 | 4/1981 | Numazawa et al. | 74/695 |

Primary Examiner—Kenneth J. Dorner
Assistant Examiner—David A. Novais
Attorney, Agent, or Firm—Parkhurst & Oliff

[57] ABSTRACT

A final speed-reduction gearing assembly is mounted within a trans-axle casing which carries an output drive pinion shaft thereon, the gearing assembly comprising a ring gear in mesh with a drive pinion integral with the drive pinion shaft, and a differential gear unit integrally connected at the outer case thereof with the ring gear, the outer case of the unit being rotatably supported at the opposite ends thereof by first and second axially spaced bearings which are respectively mounted on first and second carrier portions of the trans-axle casing. A retainer member is arranged to fasten the first bearing to the first carrier portion of the casing and to be radially detachable for adjustment of a preload axially acting on the bearings, and an annular shim plate is disposed between the first bearing and the first carrier portion in such a way as to be removable radially for adjustment of the preload.

4 Claims, 4 Drawing Figures

FINAL SPEED-REDUCTION GEARING ASSEMBLY IN TRANSMISSION UNIT

BACKGROUND OF THE INVENTION

The present invention relates to transmission units for automotive vehicles, and more particularly to a final speed-reduction gearing assembly suitable for an automatic transmission unit adapted to an internal combustion engine of the transversely mounting type.

As is illustrated in FIG. 1, such a conventional final speed-reduction gearing assembly as described above is mounted within a trans-axle casing 16 in which an output drive pinion shaft 10 is drivingly connected to a torque converter assembly 12 through a planetary gearing unit 14. The final speed-reduction gearing assembly includes a ring gear 18 in mesh with a drive pinion 11 integral with shaft 10, and a differential gear unit 20 integrally connected at its outer case 22 with ring gear 18, the outer case 22 being provided at its opposite ends with a pair of cylindrical sleevelike side-journals rotatably supported by a pair of axially spaced tapered roller bearings 26, 28 which are respectively mounted on a carrier portion A of a retainer case 24 detachably fixed to trans-axle casing 16 and a carrier portion B of trans-axle casing 16. For adjustment of a preload axially acting on tapered roller bearings 26, 28, a pair of annular shim plates 30, 30 are disposed respectively between the outer end of bearing 26 and the inner end wall of carrier portion A and between the outer end of bearing 28 and the inner end wall of carrier portion B.

In the foregoing arrangement, the final speed-reduction gearing assembly is designed to be inserted into and removed from trans-axle casing 16 through an opening 17 located at the rear side of casing 16, which is closed by a cover member 32, and after adjustment of the preload acting on tapered roller bearings 26, 28, a pair of axle shafts 34, 36 are assembled with a pair of side gears of the differential gear unit 20. In this type of final speed-reduction gearing assemblies, it is advantageous that the differential gear unit 20 can be removed from trans-axle casing 16 only by removing the cover member 32 to be disassembled for repair. It is also advantageous that the opposite ends of drive pinion shaft 10 are precisely supported in place because the trans-axle casing 16 is integrally constructed to enhance rigidity of casing 16 in comparison with that of a casing of the split type. On the other hand, it is, however, noted that in adjustment of the preload acting on tapered roller bearings 26, 28, the retainer case 24 and the differential gear unit 20 must be removed from trans-axle casing 16 and subsequently the roller bearings 26, 28 must be removed for replacement of the annular shim plates 30, 30. This results in time consumption for adjustment of the preload acting on the roller bearings and results in damage of the carrier portions A and B due to abutment against the component parts of differential gear unit 20 during the removing and assembling processes of unit 20.

SUMMARY OF THE INVENTION

It is, therefore, a primary object of the present invention to provide an improved final speed-reduction gearing assembly in which only the shim plates can be replaced in a simple manner for adjustment of the preload acting on the tapered roller bearings without removing the bearings.

According to the present invention there is provided a final speed-reduction gearing assembly for an automatic transmission unit mounted within a trans-axle casing which carries an output drive pinion shaft thereon, which gearing assembly comprises a ring gear in mesh with a drive pinion integral with the drive pinion shaft, and a differential gear unit integrally connected at its outer case with the ring gear, the outer case of the differential gear unit being provided at its opposite ends with first and second cylindrical sleevelike side-journals rotatably supported by first and second axially spaced bearings which are respectively mounted on first and second carrier portions of the trans-axle casing, and wherein a retainer member is arranged to fasten the first bearing to the first carrier portion of the trans-axle casing and to be radially detachable for adjustment of a preload acting on the bearings, and an annular shim plate is disposed between the outer end of the first bearing and the inner end wall of the first carrier portion in such a way as to be removable radially for adjustment of the preload.

BRIEF DESCRIPTION OF THE DRAWINGS

Additional objects and advantages of the present invention will be readily apparent from the following detailed desription of a preferred embodiment thereof when taken together with the accompanying drawings in which.

DETAILED DESCRIPTION OF THE PREFERRED EMBODIMENT

Figure 2:
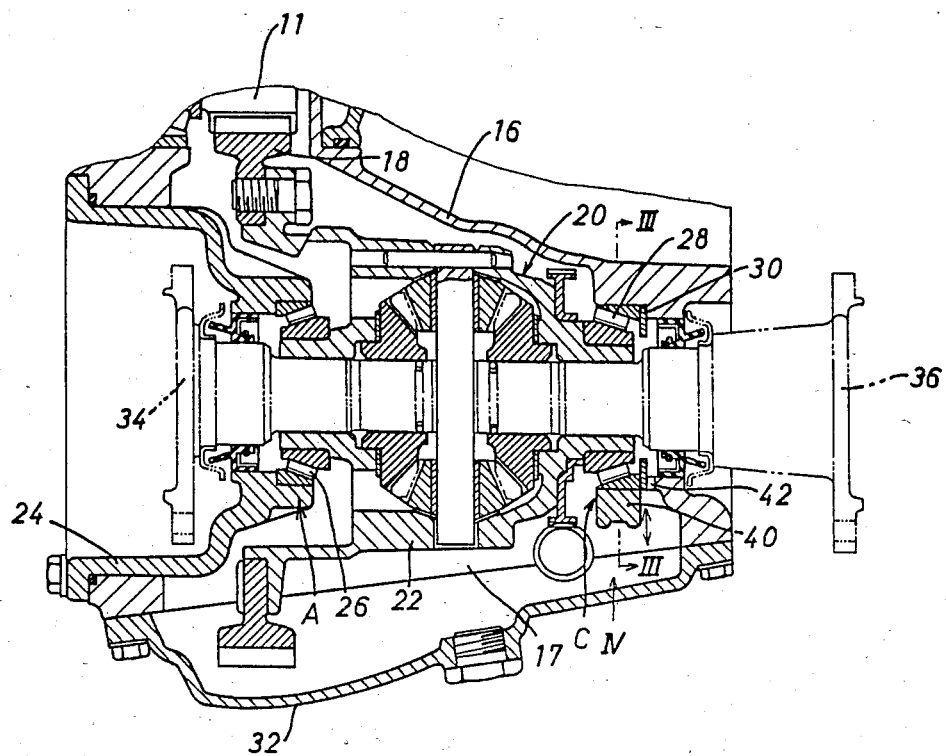
FIG. 2 is a sectional view of a final speed-reduction gearing assembly in accordance with the present invention.
Figure 3:
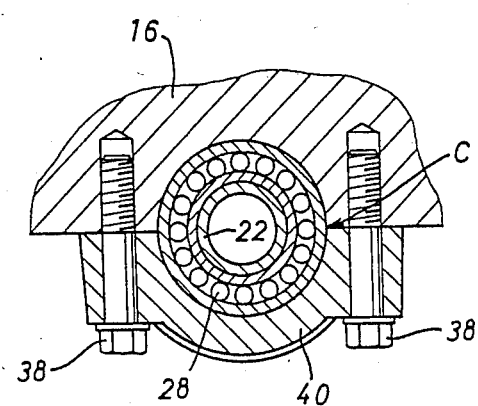
FIG. 3 is a cross-sectional view taken along line III-—III in FIG. 2.

Referring now to the drawings, particularly in FIG. 2, there is illustrated a final speed-reduction gearing assembly which is integrally mounted within an automatic transmission unit adapted to an internal combustion engine of the transversely mounting type. The speed-reduction gearing assembly includes a differential gear unit 20 the outer case 22 of which is rotatably supported by a tapered roller bearing 28 at its one side-journal. As can be well seen in FIG. 3, the roller bearing 28 is fastened to a carrier portion C of a trans-axle casing 16 by means of a retainer member 40 which is arranged to be radially detachable. The retainer member 40 is fixed in place by a pair of bolts 38, 38 threaded into the carrier portion C of trans-axle casing 16. Disposed between the outer end of roller bearing 28 and the inner end wall of carrier portion C is an annular shim plate 30 which is arranged to be radially removed without any interference and replaced with another shim plate for adjustment of a preload axially acting on bearings 26 and 28.

Figure 1:
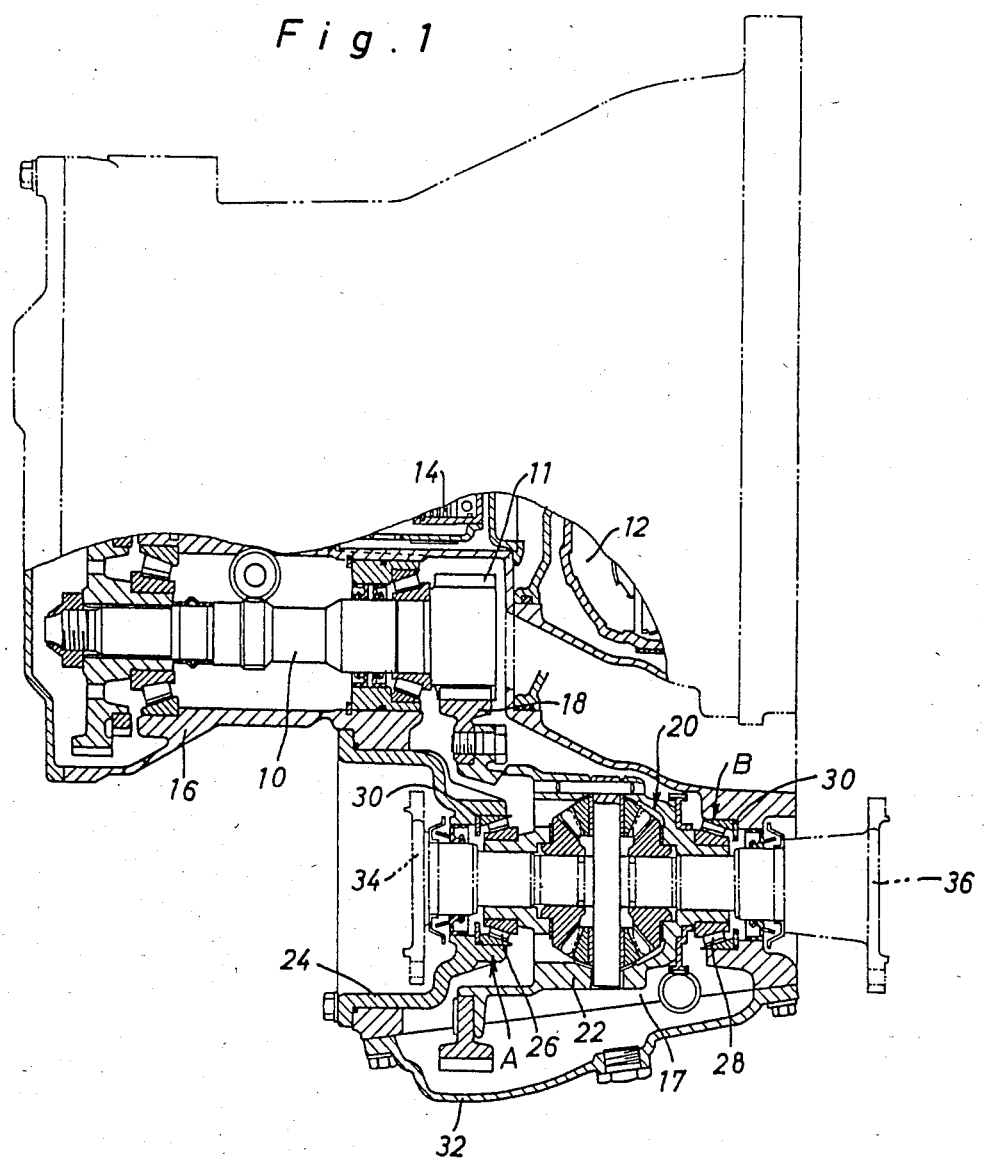
FIG. 1 is a part sectional view of an automatic transmission unit including therein a conventional final speed-reduction gearing assembly.
Figure 4:
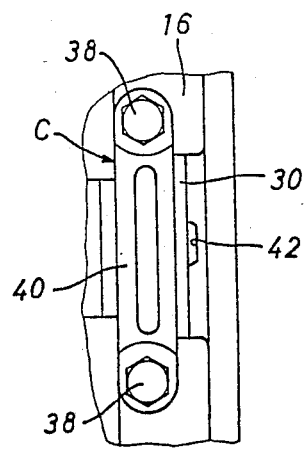
FIG. 4 is a view showing the bottom of a retainer member in the final speed-reduction gearing assembly from an arrow direction IV in FIG. 2.

As can be well seen in FIGS. 2 and 4, the carrier portion C of trans-axle casing 16 is provided at the inner end wall thereof with a radial recess 42 through which a tool is inserted to remove the annular shim plate 30. In such arrangement, the other side-journal of outer case 22 is rotatably supported by the tapered roller bearing 26 which is directly coupled within a carrier portion A of trans-axle casing 16 without provision of any annular shim plate. The other component parts are the same as those of the conventional final speed-reduction gearing assembly illustrated in FIG. 1, which are designated by the same reference numerals.

For adjustment of the preload on bearings 26, 28 in the final speed-reduction gearing assembly described above, only the cover member 32 and axle shafts 34, 36 are disassembled, and all the other component parts remain in their assembled positions. Under such a condition, the annular shim plate 30 is radially removed by the tool inserted through radial recess 42, and another annular shim plate is disposed between the outer end of bearing 28 and the inner end wall of carrier portion C. This means that only the annular shim plate 30 can be replaced without removing the roller bearings 26, 28 to minimize time consumption for adjustment of the preload on bearings 26, 28 and to avoid unexpected damage of the carrier portions A and C of trans-axle casing 16.

Although a certain specific embodiment of this invention has been illustrated and described, it is obvious that many modifications thereof are possible. The invention, therefore, is not intended to be restricted to the exact showing of the drawings and description thereof, but is considered to include reasonable and obvious equivalents.

What is claimed is:

1. In a final speed-reduction gearing assembly for a transmission unit mounted within a trans-axle casing which carries an output drive pinion shaft thereon, said speed reduction gearing assembly comprising a ring gear in mesh with a drive pinion integral with said drive pinion shaft, and a differential gear unit integrally connected at an outer case thereof with said ring gear, the outer case of said differential gear unit being provided at the opposite ends thereof with first and second cylindrical sleevelike side-journals rotatably supported by first and second axially spaced bearings which are respectively mounted on first and second carrier portions of said trans-axle casing, the improvement wherein a retainer member is radially detachably fixed to the first carrier portion of said trans-axle casing to fasten said first bearing in place, and an annular shim plate is disposed between the outer end of said first bearing and the inner end wall of the first carrier portion; and further wherein the first carrier portion includes an opening adjacent the annular shim plate to permit the annular shim plate to be removed and replaced in a radial direction to adjust a preload axially acting on said bearings, and the inner end wall of the first carrier portion is provided with a radial recess through which a tool can be inserted to remove said annular shim plate.

2. A final speed-reduction gearing assembly for an automatic transmission unit mounted within a trans-axle casing in which an output drive pinion shaft is rotatably carried in place and drivingly connected to a torque converter assembly through a planetary gearing unit, said speed-reduction gearing assembly comprising a ring gear in mesh with a drive pinion integral with said drive pinion shaft, and a differential gear unit integrally connected at an outer case thereof with said ring gear, the outer case of said differential gear unit being rotatably supported at the opposite ends thereof by first and second axially spaced tapered roller bearings which are respectively mounted on a first carrier portion of said trans-axle casing and a second carrier portion of a retainer case detachably fixed to said trans-axle casing, the improvement wherein a retainer member is radially detachably fixed to the first carrier portion of said casing to fasten said tapered roller bearing in place, and an annular shim plate is disposed between the outer end of said first tapered roller bearing and the inner end wall of the first carrier portion of said casing; and further wherein the first carrier portion includes an opening adjacent the annular shim plate to permit the annular shim plate to be removed and replaced in a radial direction to adjust a preload axially acting on said tapered roller bearings, and the inner end wall of the first carrier portion of said casing is provided with a radial recess through which a tool can be inserted to remove said annular shim plate.

3. A final speed-reduction gearing assembly as claimed in claim 1, wherein said bearings each are in the form of a tapered roller bearing.

4. A final speed-reduction gearing assembly as claimed in claim 2, wherein said second tapered roller bearing is directly and fixedly mounted to the second carrier portion of said retainer case.

* * * * *